US009868187B2

(12) United States Patent
Nagai et al.

(10) Patent No.: US 9,868,187 B2
(45) Date of Patent: Jan. 16, 2018

(54) DIAMOND ABRASIVE RECOVERY METHOD

(71) Applicant: KONICA MINOLTA, INC., Chiyoda (JP)

(72) Inventors: Yuuki Nagai, Tachikawa (JP); Akihiro Maezawa, Hino (JP); Chie Inui, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 278 days.

(21) Appl. No.: 14/786,895

(22) PCT Filed: Apr. 16, 2014

(86) PCT No.: PCT/JP2014/060782
§ 371 (c)(1),
(2) Date: Oct. 23, 2015

(87) PCT Pub. No.: WO2014/178280
PCT Pub. Date: Nov. 6, 2014

(65) Prior Publication Data
US 2016/0101504 A1    Apr. 14, 2016

(30) Foreign Application Priority Data

Apr. 30, 2013  (JP) .................................. 2013-094934

(51) Int. Cl.
*B01D 21/01* (2006.01)
*B24B 55/12* (2006.01)
*C02F 1/52* (2006.01)

(52) U.S. Cl.
CPC .............. *B24B 55/12* (2013.01); *B01D 21/01* (2013.01); *C02F 1/52* (2013.01)

(58) Field of Classification Search
CPC ............ B01D 21/01; B24B 55/12; C02F 1/52
See application file for complete search history.

(56) References Cited

U.S. PATENT DOCUMENTS 9,701,878 B2 *   7/2017  Nagai ..................... B24B 57/02

FOREIGN PATENT DOCUMENTS

| JP | 11-12562    | * | 1/1999  | ............... C09K 3/14 |
| JP | 11-33560    |   | 2/1999  |                          |
| JP | 11-90825    |   | 4/1999  |                          |
| JP | 2000-254659 |   | 9/2000  |                          |
| JP | 2000-296347 |   | 10/2000 |                          |
| JP | 2002-292566 |   | 10/2002 |                          |
| JP | 2003-321672 |   | 11/2003 |                          |

(Continued)

*Primary Examiner* — Pegah Parvini
(74) *Attorney, Agent, or Firm* — Cozen O'Connor

(57) ABSTRACT

A diamond abrasive recovery method in which diamond abrasive is recovered from polishing material slurry including diamond abrasive used for polishing a polishing target mainly composed of silicon. The method comprises (1) recovering polishing material slurry including the used diamond abrasive; (2) adding inorganic salt including a metallic element which is to be a divalent or trivalent cation to the recovered polishing material slurry to aggregate the diamond abrasive and separating a supernatant liquid from a diamond abrasive included dispersion medium; and (3) extracting diamond abrasive from the separated diamond abrasive included dispersion medium using a low polarity dispersion medium.

4 Claims, 1 Drawing Sheet

(56) References Cited

FOREIGN PATENT DOCUMENTS

| JP | 2008-115303 | 5/2008 |
|----|-------------|--------|
| JP | 2008-188723 | 8/2008 |
| JP | 2009-172712 | 8/2009 |
| JP | 2010-115751 | 5/2010 |

* cited by examiner

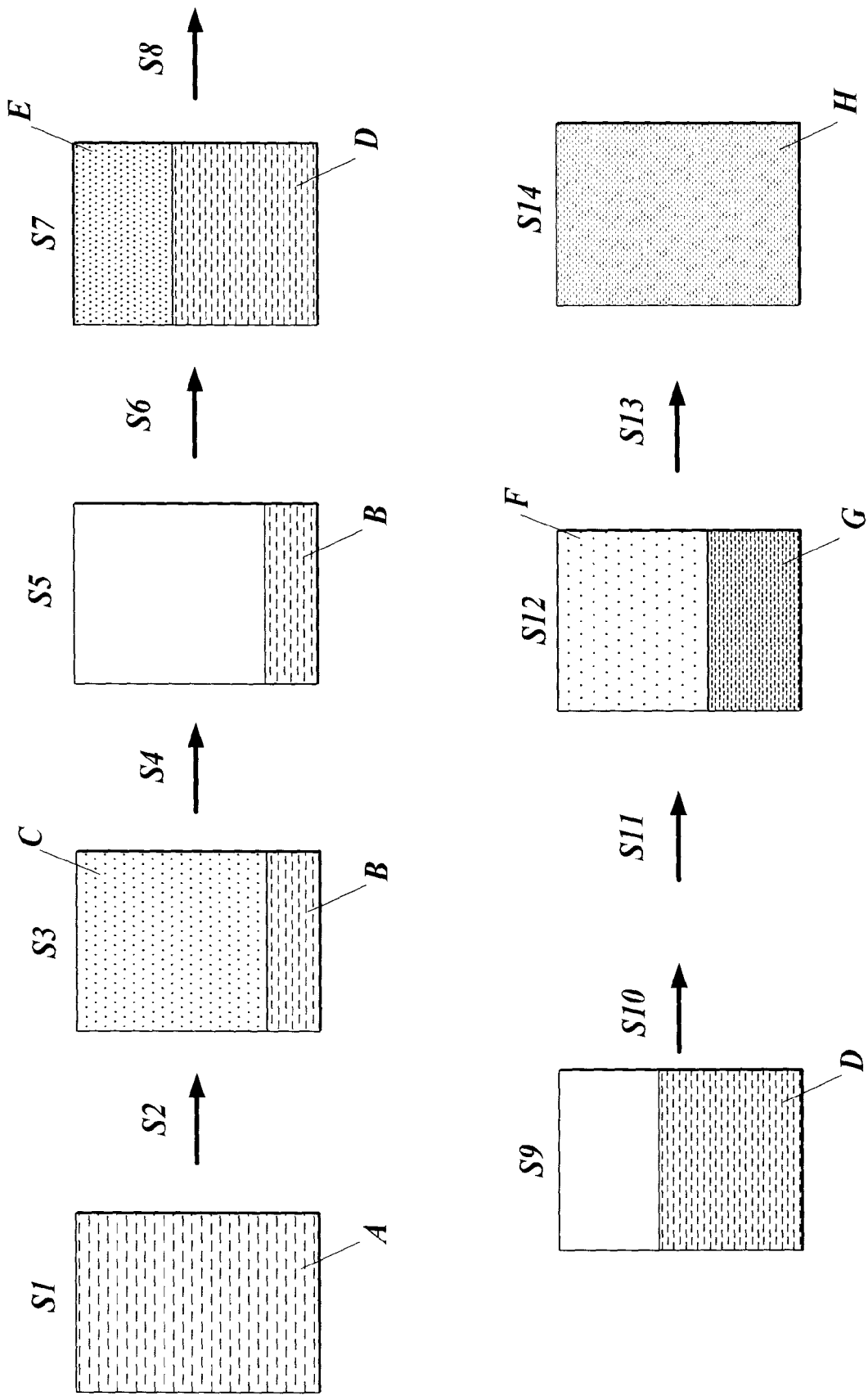

DIAMOND ABRASIVE RECOVERY METHOD

RELATED APPLICATIONS

This is a U.S. National stage of International application No. PCT/JP2014/060782 filed on Apr. 16, 2014.

This patent application claims the priority of Japanese application no. 2013-094934 filed Apr. 30,2013 the disclosure content of which is hereby incorporated by reference.

TECHNICAL FIELD

The present invention relates to a diamond abrasive recovery method. Specifically, the present invention relates to a diamond abrasive recovery method in which reproduced polishing material with high purity can be obtained.

BACKGROUND ART

As polishing material which accurately polishes in a production method of an optical glass or a semiconductor device, there are, diamonds, cerium oxide, iron oxide, aluminum oxide, zirconium oxide, colloidal silica, etc.

Some main constituent elements of the polishing material are obtained from minerals which are not found inside Japan, and some are resources relying on import. In addition, most are expensive material. Therefore, it is necessary to technically consider reuse of resources in liquid waste of polishing material including used polishing material.

As a method of processing waste water including suspended fine particles typically generated in various industrial fields, the suspended fine particles are aggregated and separated using a neutralizer, inorganic aggregating agent, macromolecular aggregating agent and the like, the processed water is discharged, and the aggregated and separated sludge is burned. With this, the waste water is disposed.

Polishing target components, such as waste from the optical glass, generated in large amounts in the polishing process is mixed in the liquid waste including used polishing material. Normally, it is difficult to effectively separate the polishing material component and the polishing target component included in the liquid waste. Therefore, at present, the polishing material liquid waste is often disposed after use. This causes the problems of cost in disposal.

Therefore, lately, it is becoming important to efficiently recover and reuse main constituent elements of the polishing material in order to conserve resources of highly scarce elements.

As a method of recovering the polishing material including the diamond abrasive, the following method is disclosed, the polishing slurry liquid waste is centrifuged, the metallic component is dissolved by processing with mineral acid such as nitric acid, and the liquid phase and the solid phase are separated to recover the diamond abrasive (for example, see patent document 1).

However, usually, few tens of liters to few hundreds of liters of polishing material slurry are repeatedly used in the polishing process. According to the method of patent document 1, the use of acid becomes a heavy burden to the environment.

PRIOR ART DOCUMENT

Patent Literature

Patent Literature 1: Japanese Patent Application Laid-Open Publication No. 2000-296347

SUMMARY OF INVENTION

Problems to be Solved by the Invention

The problem to be solved by the present invention is to provide a diamond abrasive recovery method in which reproduced polishing material with high purity can be obtained from polishing material slurry including used diamond abrasive.

Means for Solving the Problem

The inventors of the present invention studied the reasons of the problem to find a solution and found that adding inorganic salt including a metallic element which is to be a divalent or trivalent cation to the recovered polishing material slurry, aggregating some of the dispersion medium component including the diamond abrasive and fatty acid component and extracting diamond abrasive from the diamond abrasive included dispersion medium using a low polarity dispersion medium are effective for obtaining reproduced polishing material with high purity, and conceived the present invention.

In other words, the above-described problems regarding the present invention can be solved by the following.

1. A diamond abrasive recovery method in which diamond abrasive is recovered from polishing material slurry including diamond abrasive used for polishing a polishing target mainly composed of silicon, the method including:
(1) recovering polishing material slurry including the used diamond abrasive;
(2) adding inorganic salt including a metallic element which is to be a divalent or trivalent cation to the recovered polishing material slurry to aggregate the diamond abrasive and separating a supernatant liquid from a diamond abrasive included dispersion medium; and (3) extracting diamond abrasive from the separated diamond abrasive included dispersion medium using a low polarity dispersion medium.

2. The diamond abrasive recovery method according to aspect 1, wherein, the inorganic salt including the metallic element which is to be a divalent or trivalent cation used in the separating is magnesium salt, calcium salt, or aluminum salt.

3. The diamond abrasive recovery method according to aspect 1 or 2, wherein, the low polarity dispersion medium is toluene or diethyl ether.

4. The diamond abrasive recovery method according to any one of aspects 1 to 3, wherein, the recovery method of polishing material in the separating is a decantation separating method by natural sediment.

Advantageous Effects of Invention

According to the above described method, it is possible to provide a diamond abrasive recovery method in which reproduced polishing material with high purity can be obtained from the polishing material slurry including the used diamond abrasive.

The reason why the above-described effects can be achieved is not completely clear. However, it is assumed to be as follows.

According to the diamond abrasive recovery method of the present invention, inorganic salt including a metallic element which is to be a divalent or trivalent cation is added, diamond abrasive is separated from a polishing target derived component mainly composed of silicon, and by using a dispersion medium with low polarity, diamond abrasive with high purity is obtained as reproduced polishing material.

The technical idea is assumed to be derived from the unique affinity between the diamond abrasive and the inorganic salt such as magnesium salt including the metallic element which is to be the divalent or trivalent cation. The following was found. The inorganic salt including the metallic element which is to be the divalent or trivalent cation used in the present invention selectively aggregates with only diamond abrasive, and the component derived from the polishing target which is mainly composed of silicon is hardly aggregated. Therefore, it is possible to efficiently separate the above. This character provides the effect of separating with high purity the diamond abrasive from the component derived from the polishing target mainly composed of silicon.

Moreover, it is assumed to be derived from the unique affinity between the diamond abrasive and the dispersion medium with low polarity. According to the present invention, by using the dispersion medium with low polarity, it is found that the non-hydrophilic diamond abrasive can be separated from the clouded liquid including polishing material slurry (for example, fatty acid salt from fatty acid components). With this, after separating from the component derived from the polishing target which is mainly composed of silicon, the diamond abrasive can be separated with high purity from the clouded liquid including polishing material slurry (for example, fatty acid salt from fatty acid components). Therefore, complicated refining processing is not necessary and the process can be simplified.

BRIEF DESCRIPTION OF DRAWINGS

FIG. 1 is a schematic diagram showing an example of a flow of a basic process of a diamond abrasive recovery method according to the present invention.

EMBODIMENT FOR CARRYING OUT THE INVENTION

According to the present invention, a diamond abrasive recovery method in which diamond abrasive is recovered from polishing material slurry including diamond abrasive used for polishing a polishing target mainly composed of silicon includes:

(1) recovering polishing material slurry including the used diamond abrasive;

(2) adding inorganic salt including a metallic element which is to be a divalent or trivalent cation to the recovered polishing material slurry to aggregate the diamond abrasive and separating a supernatant liquid from a diamond abrasive included dispersion medium; and (3) extracting diamond abrasive from the separated diamond abrasive included dispersion medium using a low polarity dispersion medium.

This is a common technical feature in all aspects of the present invention.

Preferably, according to the embodiment of the present invention, the inorganic salt including the metallic element which is to be a divalent or trivalent cation used in the separating is magnesium salt, calcium salt, or aluminum salt. With this, the aggregation with the diamond abrasive selectively occurs, and a reproduced polishing material with higher purity can be obtained.

Preferably, according to the present invention, the low polarity dispersion medium is toluene or diethyl ether from the viewpoint of obtaining the effects of the present invention.

Preferably, according to the present invention, the recovery method of polishing material in the separating is a decantation separating method by natural sediment. With this, it is possible to suppress impurities being mixed, and reproduced polishing material with high purity can be obtained.

The composing elements of the present invention and the embodiments of the present invention are described in detail below. According to the present invention, when a range is shown, the numeric values are included as the lower limit and the upper limit.

The existing polishing material and the diamond abrasive recovery method and composing technique according to the present invention are described in detail.

[Polishing Material]

Typically, slurry in which fine particles such as diamond, red iron oxide ($\alpha Fe_2O_3$), cerium oxide, aluminum oxide, manganese oxide, zirconium oxide, colloidal silica, etc. are dispersed in water or oil is used as polishing material to polish an optical glass, semiconductor device, etc. The diamond abrasive recovery method of the present invention is applied to recovery of polishing material including diamond as abrasive.

The component and the shape of the polishing material (diamond abrasive) used in the present invention are not limited, and typical commercially available polishing material can be used.

Next, the process flow of the entire diamond abrasive recovery method according to the present invention is described with reference to the drawings.

FIG. 1 is a schematic drawing showing an example of the basic process flow of the diamond abrasive recovery method according to the present invention.

The present invention is a diamond abrasive recovery method as shown in FIG. 1 which recovers at a high purity used polishing material used in the polishing process before the slurry recovery process as the reproduced polishing material.

[Diamond Abrasive Recovery Method]

A diamond abrasive recovery method in which diamond abrasive is recovered from polishing material slurry including diamond abrasive used for polishing a polishing target mainly composed of silicon, the method including: (1) recovering polishing material slurry including the used diamond abrasive; (2) adding inorganic salt including a metallic element which is to be a divalent or trivalent cation to the recovered polishing material slurry to aggregate the diamond abrasive and separating a supernatant liquid from a diamond abrasive included dispersion medium; and (3) extracting diamond abrasive from the separated diamond abrasive included dispersion medium using a low polarity dispersion medium.

Below, each process is described in detail with reference to FIG. 1. A reference numeral corresponding to each operation and process shown in FIG. 1 is applied.

(1: Slurry Recovery Process S1)

The slurry recovery process S1 is a process in which polishing material slurry A including diamond abrasive used for polishing a polishing target mainly composed of silicon is recovered. The polishing material slurry A (hereinafter referred to as recovered polishing material slurry) including the recovered used diamond abrasive includes diamond abrasive within the range of about 0.001 to 5 percent by mass.

The recovered polishing material slurry A can be directly advanced to the separating process S3 after recovery or can be stored until a certain amount is collected. In either case, preferably, the recovered polishing material slurry A is continuously agitated to prevent aggregation of particles and to maintain a stable dispersed state.

(2: Separating Process S3)

In the separating process, the inorganic salt including the metallic element which is to be the divalent or trivalent cation is added to the recovered polishing material slurry A (S2) to aggregate the diamond abrasive, and the dispersion medium B including the diamond abrasive is separated from the supernatant liquid C. Specifically, in the separating process S3, for example, a magnesium chloride aqueous solution is added as the inorganic salt including the metallic element which is to be the divalent or trivalent cation in the polishing material slurry A recovered in the slurry recovery process S1 (S2), and the diamond abrasive is aggregated. With this, in the separating process S3, the diamond abrasive is aggregated and precipitated, and most of the glass component generated from polishing the polishing target which is mainly composed of silicon is included in the supernatant liquid C. Therefore, the diamond abrasive can be separated from the glass component.

<Inorganic Salt Including Metallic Element which is to be Divalent or Trivalent Cation>

For example, there are magnesium salt, calcium salt, and aluminum salt as inorganic salt including a metallic element which is to be a divalent or trivalent cation according to the present invention. Preferably, water soluble inorganic salt including, beryllium salt, strontium salt, barium salt, zinc, and copper is used in the present invention.

Preferably, magnesium salt in which pH change of the solution is small when added is used as the inorganic salt which can be applied to the present invention. The magnesium salt is not limited as long as a function as an electrolyte is included. From the viewpoint of high solubility in water, magnesium chloride, magnesium bromide, magnesium iodide, magnesium sulfate, magnesium acetate are preferable. From the viewpoint of small pH change in the solution and the processing of the sediment polishing material and the liquid waste being easy, magnesium chloride and magnesium sulfate are especially preferable.

It is preferable that the inorganic salt used in the present invention is a state with high water solubility, such as halide, sulfate, carbonate, acetate, etc.

In the separating process S3, when the aqueous solution including the inorganic salt is added to the recovered polishing material slurry (S2), the mixture is clouded and the diamond abrasive which is the polishing material precipitates. This is assumed to be because the acid component such as linoleic acid included in the polishing material slurry reacts with the inorganic salt and fatty acid salt is generated. In the separating process S3, the supernatant liquid C including the glass component from polishing the polishing target mainly composed of silicon can be separated from the dispersion medium B including diamond abrasive. The clouding due to fatty acid salt is included in the dispersion medium B including the diamond abrasive.

The dispersion medium B including the diamond abrasive includes clouding due to fatty acid salt and the linoleic acid and the aqueous solution of the inorganic salt included in the recovered polishing material slurry A.

The supernatant liquid C including the glass component from polishing the polishing target mainly composed of silicon includes the water included in the recovered polishing material slurry A, triethanolamine and ethylene glycol.

In the separating process S3, adding aqueous solution in which inorganic salt is dissolved is shown. Alternatively, solid inorganic salt can be added.

(3: Polishing Material Recovery Process S5)

The polishing material recovery process S5 is a process in which the polishing material (diamond abrasive) included in the dispersion medium separated in the separating process S3 is recovered.

A method of discharging the supernatant liquid C using a discharge pump (S4) can be used as the method to separate the dispersion medium B including the diamond abrasive aggregated by adding the inorganic salt (S2) from the supernatant liquid C. In other words, a method of separating only the supernatant liquid C portion by natural sediment, or a method of forcing the separation using mechanical methods such as centrifuge can be applied. In the present invention, from the view point of not mixing impurities such as glass components derived from the polishing target in the dispersion medium as sediment in the lower layer to obtain reproduced polishing material with high purity, it is preferable to use a decantation separating method in which separation is performed by natural sediment of diamond abrasive in the lower layer.

By adding the inorganic salt, the diamond abrasive is aggregated and the supernatant liquid C is separated in this state. The specific gravity of the dispersion medium B including the diamond abrasive increases compared to the polishing material slurry A recovered in the slurry recovery process S1 and is concentrated. This concentration includes the diamond abrasive which is the used abrasive and the clouding caused by fatty acid salt at a concentration equal to or larger than the recovered polishing material slurry A.

(4: Extracting Process S7)

In the extracting process S7, a low polarity dispersion medium F is added (S6) to extract diamond abrasive from the dispersion medium B including diamond abrasive separated in the separating process S3.

Here, the low polarity dispersion medium is a solvent including water with a polar group (for example, OH group), and having a content percentage of solvent such as alcohol at 20 percent by volume or less, preferably 0 to 10 percent by volume. Preferably, the type of low polarity dispersion medium selected is a dispersion medium suitable for reproduction of polishing material which is the later process. For example, preferably, toluene, diethyl ether, tetrahydrofuran, etc. are used.

It is assumed that among the diamond abrasive and the clouding recovered in the polishing material recovery process S5, for example, only the diamond abrasive which is non-hydrophilic is extracted by the low polarity dispersion medium F such as toluene. In other words, the diamond abrasive can be extracted with the low polarity dispersion medium F such as toluene. The diamond abrasive included low polarity dispersion medium is referred to with D. The clouding is in a state (clouded liquid E) dispersed in a dispersion medium including water, linoleic acid and aqueous solution of inorganic salt mainly included in the recovered polishing material slurry A.

(5: Concentrating Process S9)

In the concentrating process S9, the clouded liquid E is removed (S8), and the diamond abrasive included low polarity dispersion medium D extracted in the extracting process S7 is concentrated.

Specifically, in the concentrating process, the low polarity dispersion medium D, such as toluene, which includes diamond abrasive can be concentrated (S10) by heating.

(6: Second Separating Process S12)

In the second separating process S12, the polar solvent is added to the diamond abrasive included low polarity dispersion medium D concentrated in the concentrating process S9 (S11), and a diamond abrasive included polar dispersion medium G is separated from the low polarity dispersion medium F.

Specifically, in the second separating process S12, polar solvent such as ethylene glycol is added to the low polarity dispersion medium such as toluene concentrated in the concentrating process S9 (S11). With this, the diamond abrasive included in the low polarity dispersion medium such as toluene, etc. is moved to the polar solvent such as ethylene glycol and the low polarity dispersion medium F can be removed (S13).

Moreover, the layer of ethylene glycol including the diamond abrasive can be separated from the layer of toluene by natural separation due to difference in specific gravity.

The diamond abrasive included polar dispersion medium G obtained in the second separating process can be filtered. The filtration filter used in filtering is not limited and can be, for example, hollow fiber filter, metallic filter, bobbin filter, ceramic filter, roll type polypropylene filter, and the like.

The following can be used as the ceramic filter applicable to the present invention, for example, a ceramic filter manufactured by TAMI Industries (France), a ceramic filter manufactured by NORITAKE CO., LTD., a ceramic filter manufactured by NGK INSULATORS, LTD. (for example, cerallec DPF, cefilt, etc.) or the like.

(7: Slurry Preparing Process S14)

In the diamond abrasive recovery method of the present invention, preferably, as the final process, a slurry preparing process S14 is included as a process to prepare the recovered diamond abrasive as reproduced polishing material slurry in order to reuse the used diamond abrasive recovered in the above process.

In the slurry preparing process S14, when the diamond abrasive included polar dispersion medium G separated in the second separating process S12 is ethylene glycol, for example, water, triethanolamine, linoleic acid are added and further, ethylene glycol is added to prepare reproduced polishing material slurry H.

The type, amount and percentage of the added solvent can be suitably changed depending on the type of reproduced polishing material slurry.

<Reproduced Polishing Material (Reproduced Diamond Abrasive) Slurry>

The final diamond abrasive included reproduced polishing material slurry H obtained by the slurry preparing process S14 preferably has a higher concentration than the concentration at the time of recovery.

According to the present invention, the pH value is measured at 25° C. using a table top type Lacombe tester pH and conductivity meter (manufactured by AS ONE Corporation, PH1500).

EXAMPLES

The present invention is specifically described according to the examples but the present invention is not limited to the examples. In the examples, the display of "%" is used but this represents "% by mass" unless otherwise noted.

<<Preparation of Reproduced Polishing Material>>

[Preparation of Reproduced Polishing Material 1: Example]

According to the process below, reproduced polishing material slurry (reproduced processing material 1) using diamond abrasive as polishing material is prepared. Unless otherwise noted, the diamond abrasive recovery process is performed under the condition of, basically, 25° C. and 55% RH. Here, the temperature of the solution is also 25° C.

1) Slurry Recovery Process

After polishing processing of a glass substrate with a size of 65 mmΦ, 10 liters of the polishing material slurry including washing water was recovered. The recovered slurry liquid includes about 1 g of diamond, and also includes, 9.1 L of water, 0.375 L of triethanolamine, 0.375 L of ethylene glycol, and 0.15 L of linoleic acid.

2) Separating Process

Next, 2.5 L of magnesium chloride aqueous solution prepared at 1 mol/L was added while agitating the recovered slurry liquid.

3) Polishing Material Recovery Process

After continuing agitating in the above state for 30 minutes, the above is left quietly for 1 hour to separate the supernatant liquid from the diamond abrasive included dispersion medium by natural sediment. After 1 hour, by using a discharge pump, the supernatant liquid is discharged, and the diamond abrasive included dispersion medium is recovered. The recovered dispersion medium is 2.5 L.

4) Extracting Process 2.5 L of toluene is added in the recovered dispersion medium. After agitating for 5 minutes, the toluene layer is separated from the ethylene glycol layer by natural separation due to difference in specific gravity.

5) Concentrating Process

The toluene layer separated in the extracting process is recovered and concentrated to 0.1 L by heating.

6) Second Separating Process 0.2 L of ethylene glycol is added to the toluene layer concentrated in the concentrating process. After agitating for 5 minutes, the toluene layer is separated from the ethylene glycol layer by natural separation due to difference in specific gravity.

7) Slurry Preparing Process 9.1 L of water, 0.375 L of triethanolamine, 0.175 L of ethylene glycol, and 0.15 L of linoleic acid are added to the ethylene glycol layer obtained in the second separating process to be prepared to 10 L.

[Preparation of Reproduced Polishing Material 2: Example]

The inorganic salt used in the 2) separating process is changed from magnesium chloride to magnesium sulfate, and the rest is the same as in the preparation of the reproduced polishing material 1. With this, the reproduced polishing material 2 is obtained.

[Preparation of Reproduced Polishing Material 3: Example]

The inorganic salt used in the 2) separating process is changed from magnesium chloride to calcium chloride, and the rest is the same as in the preparation of the reproduced polishing material 1. With this, the reproduced polishing material 3 is obtained.

[Preparation of Reproduced Polishing Material 4: Example]

The inorganic salt used in the 2) separating process is changed from magnesium chloride to aluminum chloride, and the rest is the same as in the preparation of the reproduced polishing material 1. With this, the reproduced polishing material 4 is obtained.

[Preparation of Reproduced Polishing Material 5: Example]

The toluene used in the 4) extracting process is changed to diethyl ether, and the rest is the same as in the preparation of the reproduced polishing material 1. With this, the reproduced polishing material 5 is obtained.

[Preparation of Reproduced Polishing Material 6 to 13: Comparative Example]

The toluene used in the 4) extracting process is changed to ethanol, 2-propanol, acetone, acetonitrile, benzene, hexane, cyclohexane, acetic acid aqueous liquid, and the rest is the same as in the preparation of the reproduced polishing material 1. With this, the reproduced polishing material 6 to 13 are obtained.

<<Evaluation of Reproduced Polishing Material>>

The purity of the reproduced polishing material 1 to 13 was evaluated according to the following method.

First, the amount of silicon in the recovered used polishing material was obtained by ICP analysis. Then, the recovered polishing material was heated to remove all leaving only the silicon and the diamond. The amount of silicon obtained by ICP analysis was subtracted from the solid amount after heating to obtain the amount of diamond. The amount of silicon and the amount of diamond were similarly obtained for the sample after extracting, and the purity was evaluated from the relation between the amount of diamond after extracting and the amount of diamond in the recovered polishing material.

The table shows the ratio of the diamond after extracting with respect to the diamond in the recovered polishing material, and circle represents 80% by mass or more to 100% by mass or less, triangle represents 30% by mass or more to less than 80% by mass and X-mark represents less than 30% by mass.

The result obtained by the above evaluation is shown in table 1.

As can be seen from table 1, the purity of the reproduced polishing material is high in the reproduced polishing material 1 to 5 of the present invention compared to the reproduced polishing material 6 to 13. The mechanism of the above is not completely clear, but it is assumed to be due to the reactivity of the surface state of the diamond particle reacting to fatty acid salt with respect to toluene and diethyl ether.

INDUSTRIAL APPLICABILITY

The present invention can be used in the field of polishing using polishing material including diamond abrasive in a manufacturing process of glass products, semiconductor devices, and crystal oscillators.

DESCRIPTION OF REFERENCE NUMERALS

S1 slurry recovery process
S2 addition of inorganic salt
S3 separating process
S4 removal of supernatant liquid C
S5 polishing material recovery process
S6 addition of low polarity dispersion medium F
S7 extracting process
S8 removal of clouded liquid E
S9 concentrating process
S10 heating concentration
S11 addition of polar solvent
S12 second separating process
S13 removal of low polarity dispersion medium F
S14 slurry preparing process
A diamond abrasive included polishing material slurry (recovered polishing material slurry)
B diamond abrasive included dispersion medium
C supernatant liquid
D diamond abrasive included low polarity dispersion medium
E clouded liquid
F low polarity dispersion medium
G diamond abrasive included polar dispersion medium
H reproduced polishing material slurry

The invention claimed is:
1. A diamond abrasive recovery method in which diamond abrasive is recovered from polishing material slurry including diamond abrasive used for polishing a polishing target mainly composed of silicon, the method comprising:

TABLE 1

| REPRODUCED POLISHING MATERIAL NUMBER | INORGANIC SALT | LOW POLARITY DISPERSION MEDIUM | EXTRACTION BY LOW POLARITY DISPERSION MEDIUM | REMARKS |
|---|---|---|---|---|
| 1 | MAGNESIUM CHLORIDE | TOLUENE | ◯ | EXAMPLE |
| 2 | MAGNESIUM SULFATE | TOLUENE | ◯ | EXAMPLE |
| 3 | CALCIUM CHLORIDE | TOLUENE | ◯ | EXAMPLE |
| 4 | ALUMINUM CHLORIDE | TOLUENE | ◯ | EXAMPLE |
| 5 | MAGNESIUM CHLORIDE | DIETHYL ETHER | Δ | EXAMPLE |
| 6 | MAGNESIUM CHLORIDE | ETHANOL | X | COMPARATIVE EXAMPLE |
| 7 | MAGNESIUM CHLORIDE | 2-PROPANOL | X | COMPARATIVE EXAMPLE |
| 8 | MAGNESIUM CHLORIDE | ACETONE | X | COMPARATIVE EXAMPLE |
| 9 | MAGNESIUM CHLORIDE | ACETONITRILE | X | COMPARATIVE EXAMPLE |
| 10 | MAGNESIUM CHLORIDE | BENZENE | X | COMPARATIVE EXAMPLE |
| 11 | MAGNESIUM CHLORIDE | HEXANE | X | COMPARATIVE EXAMPLE |
| 12 | MAGNESIUM CHLORIDE | CYCLOHEXANE | X | COMPARATIVE EXAMPLE |
| 13 | MAGNESIUM CHLORIDE | ACETIC ACID | X | COMPARATIVE EXAMPLE |

(1) recovering polishing material slurry including the used diamond abrasive;
(2) adding inorganic salt including a metallic element which is to be a divalent or trivalent cation to the recovered polishing material slurry to aggregate the diamond abrasive and separating a supernatant liquid from a diamond abrasive included dispersion medium; and
(3) extracting diamond abrasive from the separated diamond abrasive included dispersion medium using a low polarity dispersion medium.

2. The diamond abrasive recovery method according to claim 1, wherein, the inorganic salt including the metallic element which is to be a divalent or trivalent cation used in the separating is magnesium salt, calcium salt, or aluminum salt.

3. The diamond abrasive recovery method according to claim 1, wherein, the low polarity dispersion medium is toluene or diethyl ether.

4. The diamond abrasive recovery method according to claim 1, wherein, the recovery method of polishing material in the separating is a decantation separating method by natural sediment.

\* \* \* \* \*